US005894908A

United States Patent [19]
Eftefield

[11] Patent Number: 5,894,908
[45] Date of Patent: Apr. 20, 1999

[54] UNITARY FRAME STRUCTURE

[75] Inventor: Larry G. Eftefield, Edelstein, Ill.

[73] Assignee: Caterpillar Inc., Peoria, Ill.

[21] Appl. No.: 08/851,839

[22] Filed: May 7, 1997

[51] Int. Cl.⁶ ................................................. B62D 21/00
[52] U.S. Cl. ................................. 280/781; 280/797
[58] Field of Search .......................... 180/311; 280/787, 280/797, 798

[56] References Cited

U.S. PATENT DOCUMENTS

| | | | |
|---|---|---|---|
| 2,861,812 | 11/1958 | Pilch | 280/798 |
| 3,645,350 | 2/1972 | Deli et al. | 280/781 |
| 4,120,511 | 10/1978 | Allen et al. | 280/795 |
| 4,151,920 | 5/1979 | Shoup | 414/697 |
| 4,186,812 | 2/1980 | Sutton | 180/9.5 |
| 4,191,401 | 3/1980 | Krolak et al. | 280/796 |
| 4,397,481 | 8/1983 | Dion et al. | 280/781 |
| 4,428,173 | 1/1984 | Knell | 52/731 |
| 4,506,757 | 3/1985 | Matsumoto et al. | 280/781 |

*Primary Examiner*—Kenneth R. Rice
*Attorney, Agent, or Firm*—J. W. Burrows

[57] ABSTRACT

An integral frame structure is provided to better absorb vibrations, stresses and/or high drawbar pull introduced in a machine by rear mounted attachments. The integral frame structure includes first and second spaced apart longitudinally extending beam members, a lower front cross beam portion connected to the first and second spaced apart longitudinally extending beam members and a rear beam portion connected to the first and second spaced apart longitudinally extending beam members adjacent the ends thereof. A rear mounted attachment mechanism is secured to the rear beam portion and adapted to attach a work implement. A portion of each of the lower front cross beam portion and the rear beam portion extends outwardly from each of the first and second spaced apart longitudinally extending beam members. An upper portion of the first and second spaced apart longitudinally extending beam members has a box shaped cross-section along its longitudinal length and the bottom portion thereof extends downwardly and outwardly to provide added vertical strength to the integral frame structure.

9 Claims, 7 Drawing Sheets

FIG-3

Fig_6_

Fig_7_

UNITARY FRAME STRUCTURE

TECHNICAL FIELD

This invention relates generally to a frame structure for a machine and more particularly to a unitary frame structure having supporting beam structures for mounting various components, such as, an engine, cab and platform structure, and an auxiliary rear mounted attachment.

BACKGROUND ART

In the known machines there are various types of frame structures that permit the mounting of the engine, final drives, and various types of loader linkages or bulldozer arrangements. However, in these known frames, the construction of the frames do not provide ample structure to mount the various items while still providing a rugged construction that permits the attachment of rear mounted attachments that induce large amounts of stress, vibrations or high draw bar pull to the frame.

The present invention is directed to overcoming one or more of the problems as set forth above.

DISCLOSURE OF THE INVENTION

In one aspect of the present invention, an integral frame structure is provided and adapted for use on a machine having an engine, a transmission, associated cab and platform structure, and a rear mounted attachment mechanism operatively mounted thereon. The integral frame structure includes an elevated beam portion composed of first and second spaced apart longitudinally extending beam members each including formed plate members secured one to the other to form the respective longitudinally extending beam members, a lower front cross beam portion composed of formed plate members extending between and integrally secured to each of the longitudinally extending beam members, a rear beam portion having a rear attachment portion secured thereto and composed of vertically and horizontally oriented plate members secured one to the other to form the rear beam portion and integrally secured to each of the longitudinally extending beam members, and a bottom plate member secured to and extending transversely between the first and second longitudinally extending beam members and secured to and extending longitudinally between the bottom of the rear beam portion and the bottom of the front cross beam portion.

BEST MODE FOR CARRYING OUT THE INVENTION

Figure 1:
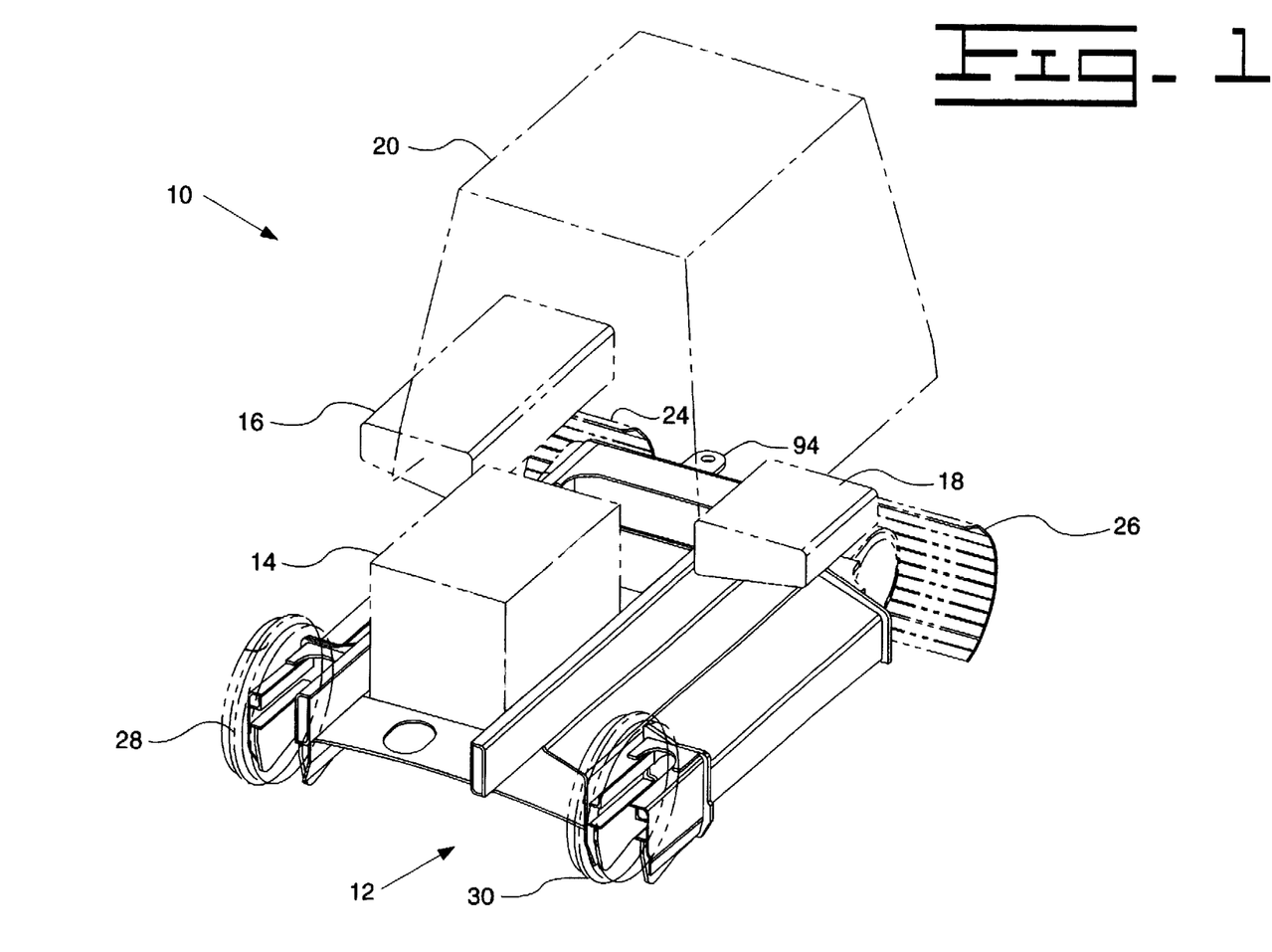
FIG. 1 is a diagrammatic representation of a machine incorporating an embodiment of the subject invention.

Referring to the drawings and more particularly to FIG. 1, a machine 10 is illustrated and includes an integral frame structure 12. An engine and associated transmission 14, a fuel tank 16, a hydraulic tank 18, an associated cab and platform structure 20 and a rear mounted attachment mechanism 22 are each respectively mounted on the integral frame structure 12.

As generally illustrated, right and left tracks 24, 26 are rotatably mounted on each side of the machine 10 in a conventional manner. As illustrated front idlers 28, 30 are connected to the integral frame 12 to support the right and left tracks in a conventional manner.

Figure 2:
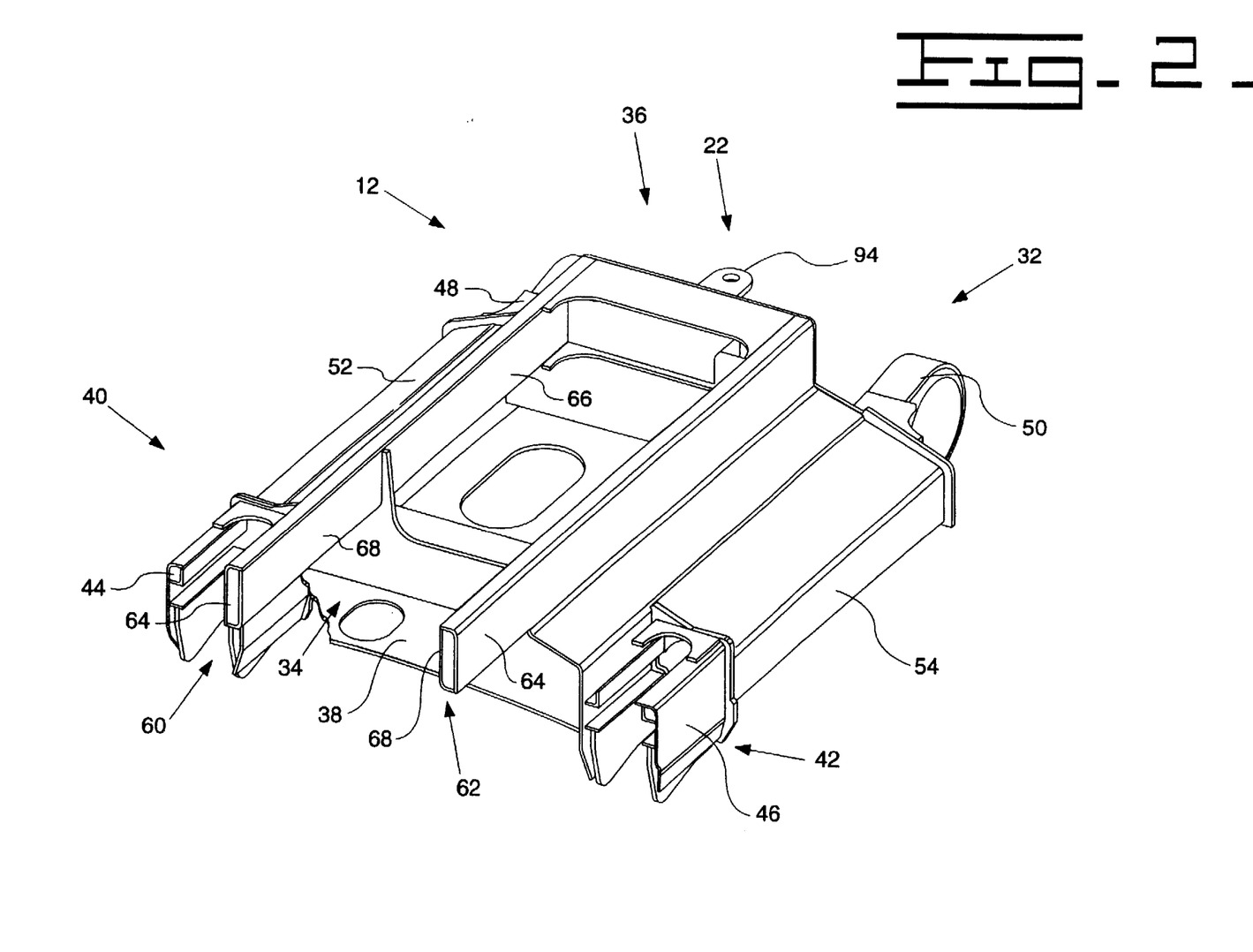
FIG. 2 is an isometric view of an integral frame structure of the machine of FIG. 1.
Figure 3:
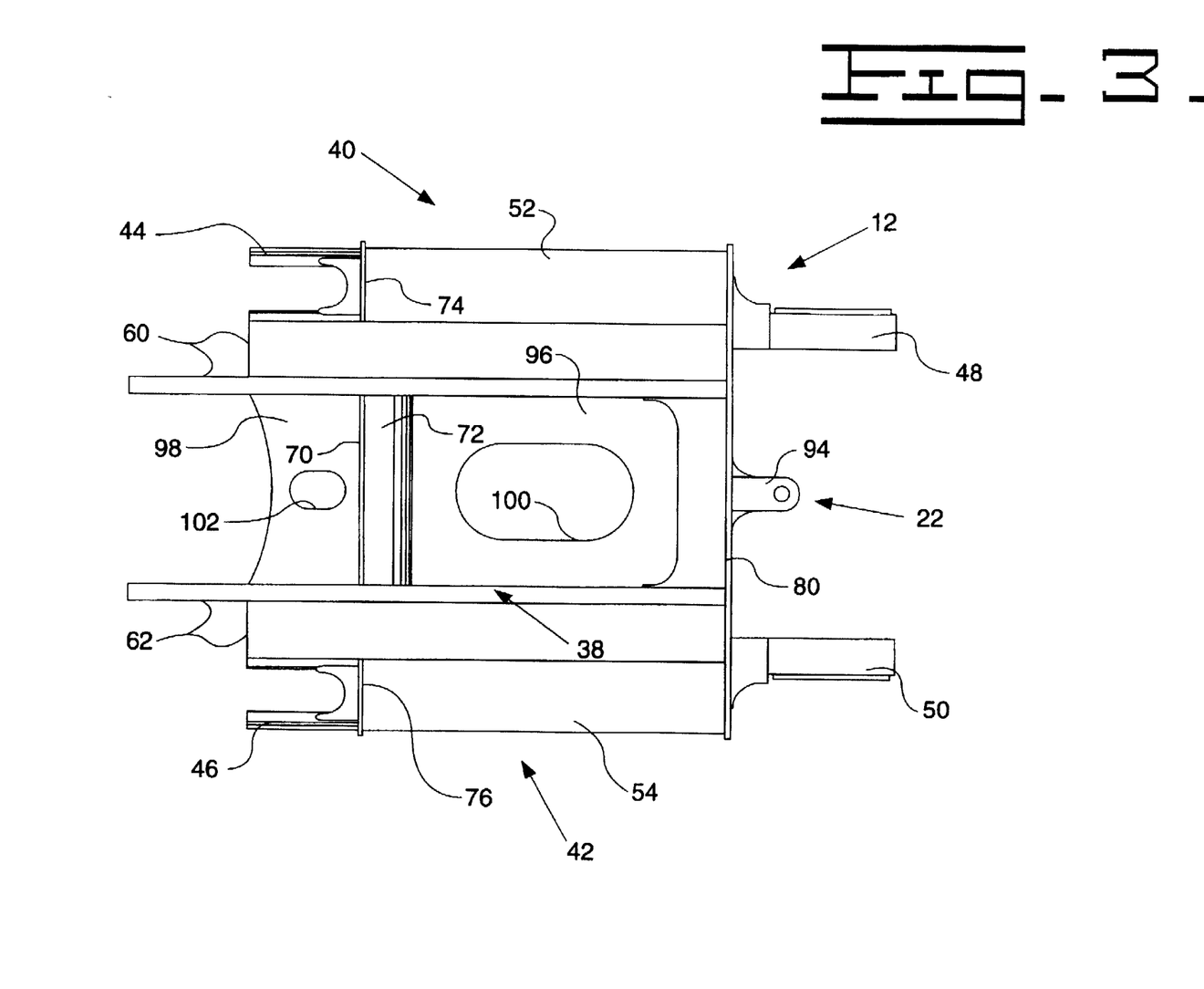
FIG. 3 is a top view of the integral frame structure of FIG. 2.
Figure 4:
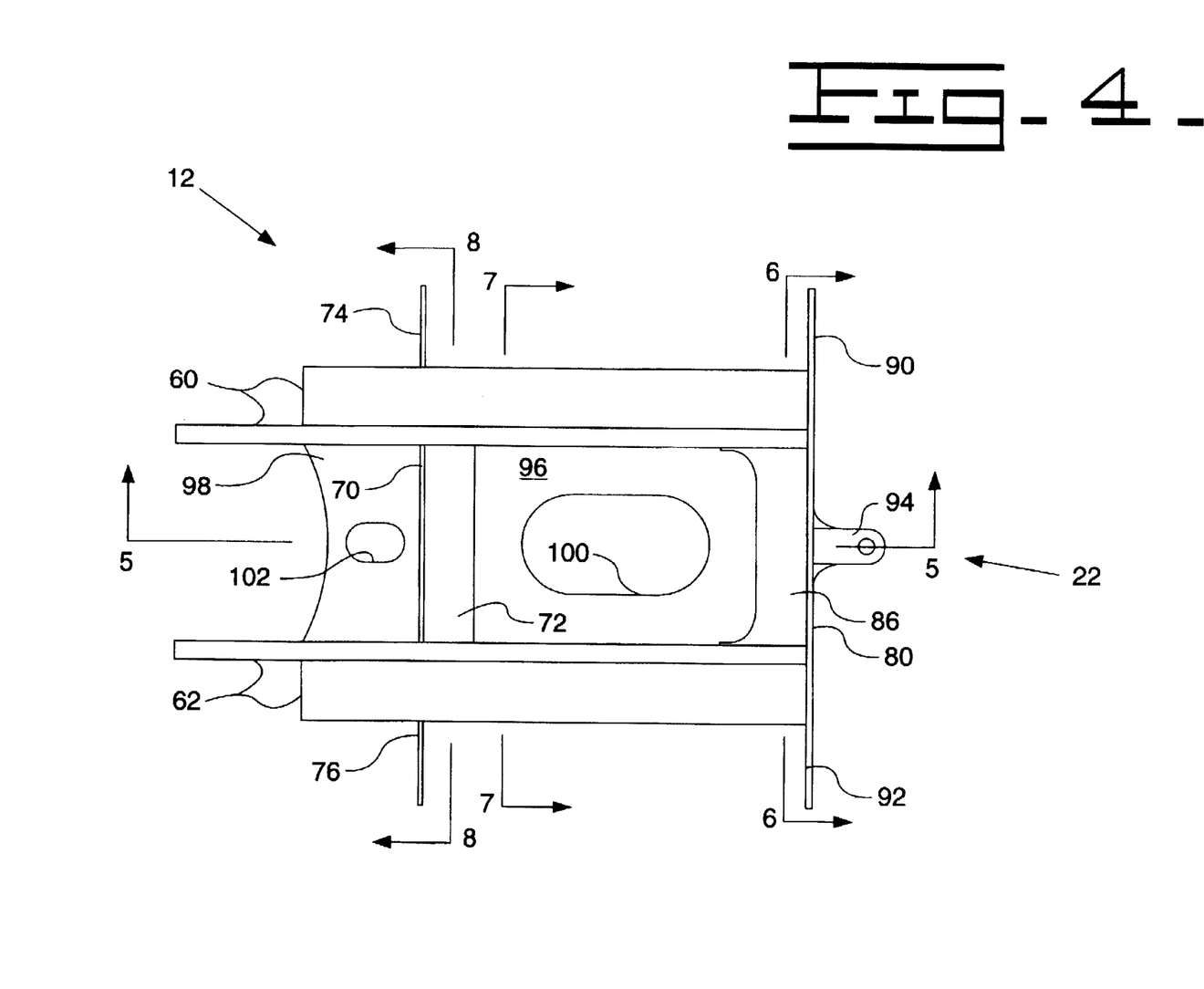
FIG. 4 is a top view of the integral frame structure with portions removed.
Figure 5:
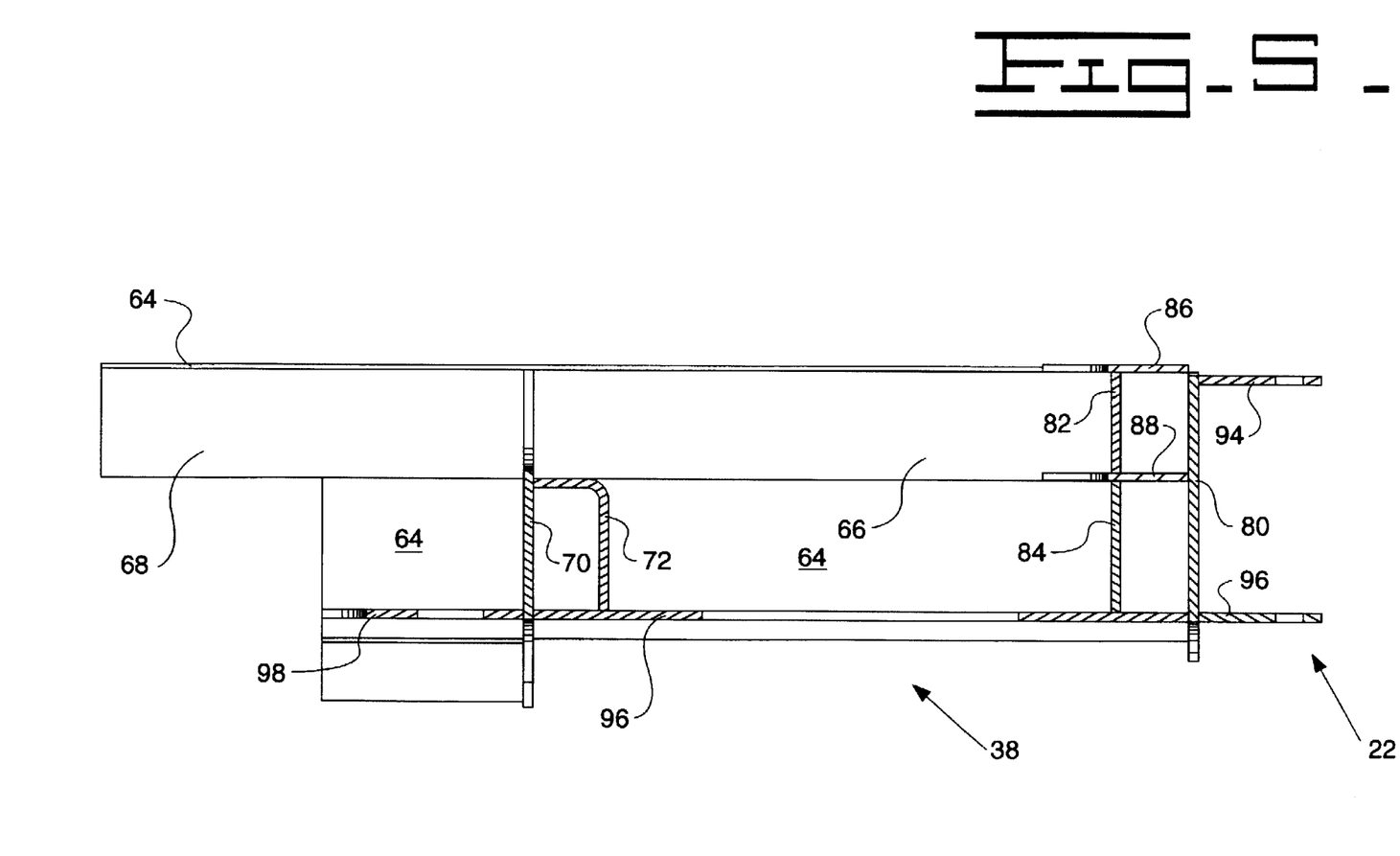
FIG. 5 is a cross-sectional view taken along the line 5—5 of FIG. 4.
Figure 6:
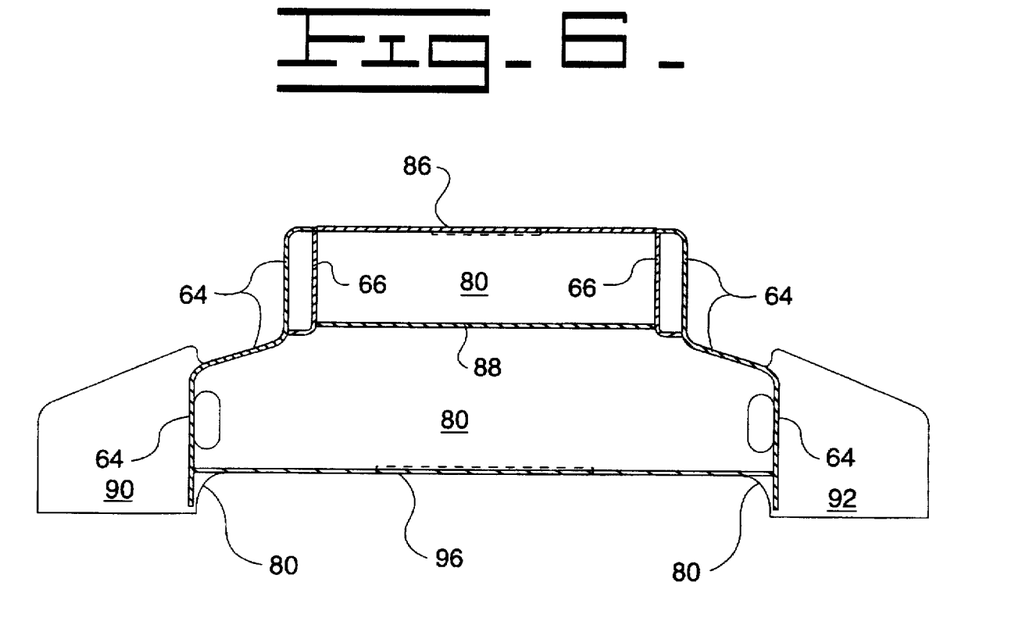
FIG. 6 is a cross-sectional view taken along the line 6—6 of FIG. 4.
Figure 7:
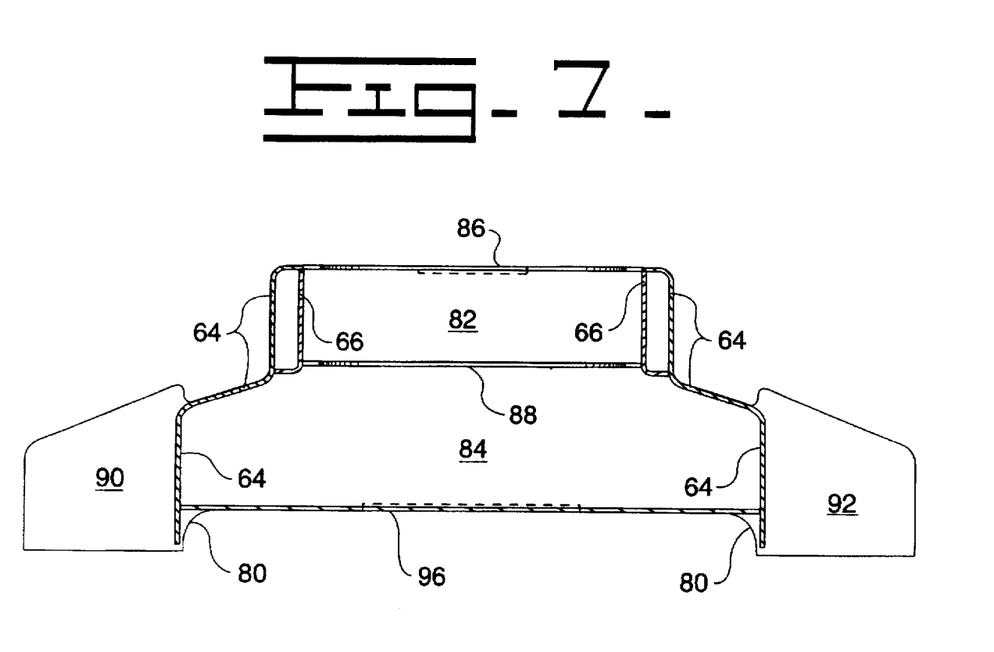
FIG. 7 is a cross-sectional view taken along the line 7—7 of FIG. 4.
Figure 8:
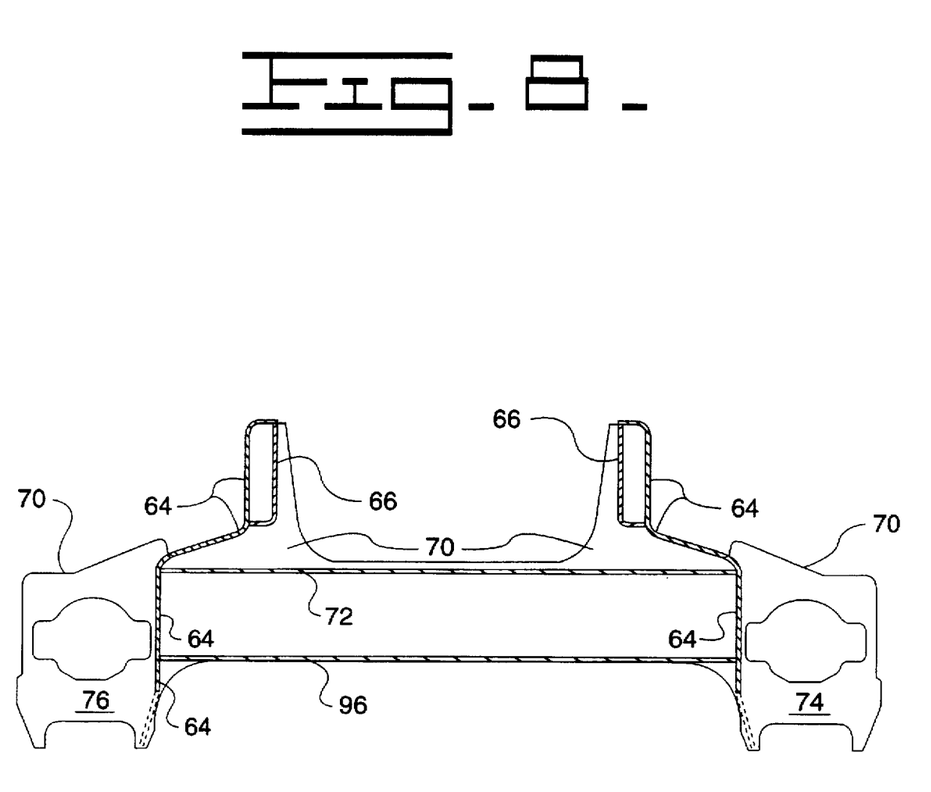
FIG. 8 is a cross-sectional view taken along the line 8—8 of FIG. 4.

Referring to FIGS. 2 and 3, the integral frame structure 12 is shown in greater detail. The integral frame structure 12 includes an elevated beam portion 32, a lower front cross beam portion 34, a rear beam portion 36, and a bottom plate arrangement 38. First and second undercarriage frame structures 40, 42 are integrally formed on each side of the integral frame structure 12. Each of the first and second undercarriage frame structures 40, 42 are formed by respective first and second front idler structural members 44, 46, respective first and second final drive structural members 48, 50, and respective first and second formed plates 52, 54 that are secured to at least portions of the elevated beam portion 32, the lower front cross beam portion 34 and the rear beam portion 36.

Referring also to FIGS. 4–8, the elevated beam portion 32 includes first and second spaced apart longitudinally extending beam members 60, 62. Each of the longitudinally extending beam members 60, 62 include first, second and third formed plate members 64, 66, 68 secured together, such as by welding. The second and third formed plate members 66, 68 are secured to an upper portion of the first member 64 along its longitudinal length to form a box beam section. The second and third formed plate members 66, 68 have an "L" shaped configuration along their respective longitudinal lengths. An upper portion of the respective first formed plate member 64 has an "L" shaped configuration along its longitudinally length. The box shaped cross-section is formed once the second and third formed plate members 66, 68 are secured to the "L" shaped configuration of the first formed plated member 64. A lower portion of the first formed plate member 64 extends downwardly and outwardly from the box beam section for a predetermined distance and then extends downwardly for another predetermined distance.

The lower front cross beam portion 34 includes first and second formed plate members 70, 72 secured to each other. The second plate member 72 is shorter than the first plate member 70 and has an "L" shaped configuration. The lower front cross beam portion 34 is secured to the first and second elevated beam portions 32 and disposed relative thereto such that the second formed plate member 72 is disposed between the lower portion of the respective first formed plate members 64.

A first portion 74 of the first formed member 70 of the lower front cross beam portion 34 extends beyond the lower portion of one of the first formed plate members 64 and a second portion 76 of the first formed member 70 extends beyond the lower portion of the other one of the first formed plate members 64. In the subject embodiment, the first formed member 70 is a flat member and is firmly secured to the respective first formed plate members 64 at the point where it transversely extends through the respective first formed plate members 64. Additional, in the subject embodiment, the first and second front idler structural members 44, 46 are secured to the front side of the respective first and second extending portions 74, 76 and to a portion of the lower portion of the respective first formed plate members 64 of the elevated beam portion 32.

The rear beam portion 36 includes first, second, and third vertically oriented plate members 80, 82, 84 and first and second horizontally oriented plate members 86, 88 that are secured together. The first and second horizontally oriented plate members 86, 88 are secured to the first vertically oriented plate member 80 spaced from one another and disposed between the respective longitudinally extending beam members 60, 62 at a location generally adjacent the ends thereof. The second vertically oriented plate member 82 is secured between the first and second horizontally oriented plate members 86, 88 and the respective longitudinally extending beam members 60, 62 and spaced from the first vertically oriented plate member 80. The third vertically oriented plate member 84 is secured to the second horizontally oriented plate member 88 and the respective longitudinally extending beam members 60, 62 at a location below the second vertically oriented plate member 82 and spaced from the first vertically oriented plate member 80.

A first portion 90 of the first vertically oriented plate member 80 extends beyond one of the longitudinally extending beam members 60, 62 and a second portion 92 extends beyond the other one of the longitudinally extending beam members 60, 62. The first and second final drive structural members 48, 50 are secured to at least a portion of the respective first and second extending portions 90, 92 of the first vertically oriented plate member 80.

The rear mounted attachment mechanism 22 is secured to the first vertically oriented plate member 80 generally at its transverse midpoint. The rear mounted attachment mechanism 22 of the subject embodiment includes first and second attachment members 94, 96 that are respectively secured to the first vertically oriented plate member 80. It is recognized that the first and second attachment members 94, 96 of the rear mounted attachment mechanism 22 could extend through the first vertically oriented plate member 80 and be integrally secured to various members of the rear beam portion 36 as well as the first vertically oriented plate member 80 without departing from the essence of the invention. Likewise it is recognized that the rear mounted attachment mechanism 22 could be a single member secured to the back of the first vertically oriented plate member 80.

The bottom plate arrangement 38 includes first and second bottom plates 96, 98. An access opening 100 is defined in the first bottom plate and an access opening 102 is defined in the second bottom plate. The first bottom plate 96 is disposed between and secured to the lower portion of the respective first and second longitudinally extending beam members 60, 62. The first bottom plate 96 is also secured to and extends from the rear beam portion 36 and the lower front cross beam portion 34. The second bottom plate 98 is secured to the lower front cross beam portion 34 and extends forwardly between the lower portion of the respective first and second longitudinally extending beam members 60, 62. The access openings 100, 102, as illustrated, are defined in the mid portion of the respective bottom plates 96, 98, but it is recognized that the respective openings 100, 102 could be defined in other locations. Furthermore, it is recognized that the bottom plate arrangement 38 could be made of one piece as opposed to two pieces.

INDUSTRIAL APPLICABILITY

During use of the subject integral frame structure 12, any high stresses, vibrations, or high drawbar pull are counteracted by the integral frame construction. More specifically, the respective first formed plate members 64 of the first and second spaced apart longitudinally extending beam members 60, 62 provide the ability to withstand large vertical forces as well as transversely applied forces. By securing the second and third formed plate members 66, 68 to the upper portion of the respective first formed plate member 64, the resulting box cross-section provides the needed strength to attach the engine 14, fuel tank 16, and other components while stilling maintaining a light weight structure.

The first formed plate member 70 of the lower front cross beam portion 34 and the first vertically oriented plate member 80 of the rear beam portion 36 that are both secured to the respective first and second longitudinally extending beam members 60, 62 provide lateral support to the integral frame structure 12.

Additionally, since the first front idler structural members 44 is secured to the first extending portion 74 of the first formed plate member 70 and the first final drive structural member 48 is secured to the first extending portion 90 of the first vertically oriented plate member 80 with the first longitudinally extending formed plate member 52 secured therebetween, the resulting undercarriage frame structure 40 is very strong. Furthermore, since the first longitudinally extending formed plate 52 is secured to the lower portion of the first formed plate member 64 of the first longitudinally extending beam member 60, the integral frame structure is able to absorb high stresses that may be introduced thereto during operation. Since the second undercarriage frame structure 42 is secured in the same manner, the total integral frame structure 12 readily handles the forces and stresses subjected thereto.

In view of the foregoing, it is readily recognized that by having the rear mounted attachment mechanism 22 secured to the rear beam portion 36, any stresses, high drawbar pull or vibrations introduced thereby is absorbed through the integral frame structure 12. Due to the construction of the subject integral frame structure 12, the life thereof is increased even when operated under adverse operating conditions.

Other aspects, objects and advantages of the invention can be obtained from a study of the drawings, the disclosure and the appended claims.

I claim:

1. An integral frame structure adapted for use on a machine having an engine, a transmission, a cooling system, associated cab and platform structure, and a rear mounted attachment mechanism operatively mounted thereon, the integral frame structure comprising:

an elevated beam portion composed of first and second spaced apart longitudinally extending beam members each including formed plate members secured one to the other to form the respective longitudinally extending beam members;

a lower front cross beam portion composed of formed plate members extending between and integrally secured to each of the longitudinally extending beam members;

a rear beam portion having a rear attachment portion secured thereto and composed of vertically and horizontally oriented plate members secured one to the other to form the rear beam portion and integrally secured to each of the longitudinally extending beam members; and a bottom plate member secured to and extending transversely between the first and second longitudinally extending beam members and secured to and extending longitudinally between the bottom of the rear beam portion and the bottom of the front cross beam portion.

2. The integral frame structure of claim 1 wherein an upper portion of the respective longitudinally extending beam members has a box shape cross-section along its longitudinal length and a lower portion of one of the formed plate members of each of the longitudinally extending beam members extends downwardly and outwardly from the upper portion of the respective longitudinally extending beam members.

3. The integral frame structure of claim 2 wherein a first portion of one of the formed plate members of the lower front cross beam portion extends outwardly beyond one of the longitudinally extending beam members and a second portion extends outwardly beyond the other one of the longitudinally extending beam members.

4. The integral frame structure of claim 3 wherein a first portion of one of the vertically oriented plate members of the rear beam portion extends outwardly beyond one of the longitudinally extending beam members and a second portion extends outwardly beyond the other one of the longitudinally extending beam members.

5. The integral frame structure of claim 4 wherein a first longitudinally extending formed plate is secured between the first portion of the one formed plate member of the lower front cross beam portion that extends outwardly and the first portion of the one vertically oriented plate member of the rear beam portion that extends outwardly and to the portion of one of the longitudinally extending beam members that extends downwardly and outwardly to form a first undercarriage frame structure.

6. The integral frame structure of claim 5 wherein a second longitudinally extending formed plate is secured between the second portion of the one formed plate member of the lower front cross beam portion that extends outwardly and the second portion of the one vertically oriented plate member of the rear beam portion that extends outwardly and to the portion of the other one of the longitudinally extending beam members that extends downwardly and outwardly to form a second undercarriage frame structure.

7. The integral frame structure of claim 6 including first and second final drive structural members secured to the respective first and second portions of the one vertically oriented plate member on the side thereof opposite to the respective first and second longitudinally extending formed plates, and first and second front idler structural members secured to the respective first and second portions of the one formed plate member of the lower front cross beam portion on the side thereof opposite to the respective fist and second longitudinally extending formed plates.

8. The integral frame structure of claim 7 wherein the lower front cross beam portion includes two separate formed plates secured together, the one formed plate that includes the first and second portion is one continuous member and the other formed member extends only between the respective downwardly extending portion of the one formed plate member of the longitudinally extending beam members.

9. The integral frame structure of claim 8 wherein the one vertically oriented plate member of the rear beam portion that includes the first and second portions is one continuous member.

* * * * *